(12) United States Patent
Ray et al.

(10) Patent No.: US 11,643,552 B2
(45) Date of Patent: May 9, 2023

(54) POLYAMIDE BLENDS FOR POLYMER FILMS

(71) Applicant: ASCEND PERFORMANCE MATERIALS OPERATIONS LLC, Houston, TX (US)

(72) Inventors: Jacob G. Ray, Pace, FL (US); Ramesh Ramakrishnan, Pensacola, FL (US); Douglas Claire Hoffman, Pensacola Beach, FL (US); Roland M. Planeta, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 86 days.

(21) Appl. No.: 17/307,020

(22) Filed: May 4, 2021

(65) Prior Publication Data

US 2021/0347993 A1 Nov. 11, 2021

Related U.S. Application Data (60) Provisional application No. 63/020,243, filed on May 5, 2020.

(51) Int. Cl.
*C08L 77/06* (2006.01)
*C08J 5/18* (2006.01)

(52) U.S. Cl.
CPC .............. *C08L 77/06* (2013.01); *C08J 5/18* (2013.01); *C08J 2377/06* (2013.01); *C08J 2477/06* (2013.01); *C08L 2205/025* (2013.01)

(58) Field of Classification Search
CPC .................... C08L 77/00–06; C08L 2205/025
See application file for complete search history.

(56) References Cited

U.S. PATENT DOCUMENTS

2018/0030271 A1* 2/2018 Park .................. C08L 77/02
2020/0032057 A1 1/2020 Ray et al.

FOREIGN PATENT DOCUMENTS

| CN | 108350235 A | 7/2018 |
|---|---|---|
| CN | 108515762 A | 9/2018 |
| JP | 2017025308 A | 2/2017 |
| WO | 2017058857 A1 | 4/2017 |

\* cited by examiner

*Primary Examiner* — Ana L. Woodward
(74) *Attorney, Agent, or Firm* — Cozen O'Connor (57) ABSTRACT

Provided herein are polymer films including a polyamide composition of PA6 and PA66/6. The provided films are particularly useful as packaging materials as they exhibit improved toughness, e.g., puncture and impact resistance, relative to that of conventional films that include only PA6 as a polyamide component. Also provided are methods for making the provided films, and articles that include the provided films.

20 Claims, 2 Drawing Sheets

POLYAMIDE BLENDS FOR POLYMER FILMS

CROSS-REFERENCE TO RELATED APPLICATION

This application is related to and claims priority to U.S. Provisional Application No. 63/020,243, filed May 5, 2020, which is incorporated herein by reference.

FIELD

The present disclosure relates generally to polymer films, e.g., biaxially oriented (BO) or machine direction oriented (MDO) films, having improved puncture and impact resistance and which are particularly useful for packaging material applications.

BACKGROUND

Polymer films or membranes are often used to separate areas or volumes, to hold items, or to act as barriers. Such functional uses of polymer films allow them to serve key roles in industrial or food packaging applications. Examples of multilayer polymer film packaging can be found, for example, in meat and cheese packaging, stand-up pouches, and shrink films used for bone-in meats. Examples of monolayer polymer film packaging can be found, for example, as cooking bags or as vacuum bagging and protective film for the curing of composite structures such as windmill blades used in capturing wind energy. Oriented monolayer polymer films additionally find use in composite laminate structures such as those of coffee packaging or retort pouches.

Recent trends in consumers and retailer preferences are increasing demand for packaging materials that are made from fewer resources, while simultaneously delivering an expected performance, look, and feel. This demand has driven an interest in reducing polymer packaging film thickness, i.e., film gauge, to decrease material requirements and improve sustainability without significantly affecting the reliability of the film. Such downgauging can result in considerable cost savings in film production processes. These economic benefits must be weighed, however, against any negative costs associated with film failures such as ripping or bursting, brought about by an insufficient strength for a downstream film product application.

Certain nylons, or polyamides, are among the most commonly used polymer materials in film and packaging applications, and is often selected due to its generally good strength and barrier properties. The high melting point and low cost of certain polyamides, such as polyamide 6 (PA6), also make them practical and economical choices for packaging materials that are thermoformed or drawn into a three-dimensional shape. Polyamide 6 films also benefit from high ease of processing and thermal and rheological compatibility with other thermoplastic components of multilayer laminates. The toughness of polyamide 6 films, as measured for example by puncture resistance and impact resistance, however, is not as high as that of other more expensive or less easily processed polymers, particularly as the polyamide 6 film thickness is reduced.

Thus, the need exists for polyamide films having enhanced characteristics that include improved puncture resistance, elongation, toughness, tear strength, and shrink resistance, while maintaining attractive component and processing cost efficiencies.

SUMMARY

In one aspect, the disclosure is to a polymer film including a polyamide composition. The polyamide composition includes less than or equal to 85 wt % of a PA6 polymer and greater than or equal to 15 wt % of a PA66/6 copolymer. In some embodiments, the relative viscosity of the polyamide composition as measured in formic acid ranges from 60 to 250. In some embodiments, the PA66/6 copolymer of the polyamide composition is a statistical copolymer. In some embodiments, the PA66/6 copolymer includes greater than 70 wt % adipic acid-hexamethylene diamine units and less than 30 wt % caprolactam units. In some embodiments, the PA66/6 copolymer has a melting point ranging from 200° C. to 255° C. The film demonstrates a puncture resistance that is greater than 800 N/mm, e.g., greater than 850 N/mm. In some embodiments, the film demonstrates an impact resistance that is greater than 9.6 N. In some cases, the film thickness may be less than 26 microns and/or the film may demonstrate a puncture resistance that is greater than 825 N/mm. The concentration of total caprolactam units in the polyamide composition may range from 26 wt % to 74 wt % and/or the concentration of total caprolactam units in the non-PA6 may range from 5 wt % to 40 wt %.

In another aspect, the disclosure relates to a method of preparing a polymer film. The method includes providing a PA6 polymer and a PA66/6 copolymer. The method further includes blending the PA6 polymer and the PA66/6 copolymer to create a polyamide composition that includes greater than or equal to 15 wt % PA66/6 copolymer. The method further includes casting the created polyamide composition to form a film. The method further includes stretching the formed film, thereby preparing the polymer film, wherein the film demonstrates puncture resistance that is greater than 850 N/mm.

In another aspect, the disclosure is to an article that includes a polymer film as provided herein.

DETAILED DESCRIPTION

The present disclosure generally relates to polymer films that, when employed for example as a film in packaging applications, provide advantageous improvements in puncture and impact resistance, toughness, and/or strength.

For example, although it has not been yet achieved, it would be beneficial for polymeric film to have sufficient strength to resist ripping or bursting in response to forces that are likely to be experienced when the film is used to package foods, chemicals, or other items. The ability of a polymer film to demonstrate a high puncture and impact resistance can further advantageously improve the costs of film production and use, as the thickness of the film can then be reduced while still allowing the film to achieve desired strength requirements. It is also beneficial for a polymeric packaging film to have low heat shrinkage, resulting in improved robustness of the film to higher temperatures, and better compatibility with other components in multilayer laminate applications.

It has been difficult, however, for conventional polymer films to simultaneously meet these different performance demands, while also remaining economical. One reason for this is that polyamide 6 (PA6), the most widely-used polyamide in the polymer film market, does not exhibit as high a degree of toughness (for example puncture resistance/ elongation) as other more costly alternatives. Conventional polymer films, e.g., BP oriented (BPO) or MD oriented (MDO) films, typically include PA6 homopolymer as their only polyamide or polymer component. PA6 is typically chosen for use in films at least in part because of its relatively low cost and high processability. In particular, PA6 has a crystallization rate which is amenable to the stretching and thermoforming of PA6 films. PA6 also has very good dimensional stability and compatibility with other thermoplastics found in multilayer extrusions in terms of important properties such as heat resistance and rheology. In contrast, the use of other polyamides such as PA66 as substitutes for PA6, while often resulting in films having enhanced toughness and barrier properties, can lead to significant disadvantages in film versatility and flexibility. These substitute polyamides typically have a higher cost and more rapid crystallization rate than that of PA6 or PA6-rich copolymers, affecting such film processing characteristics as blow up ratios, the ability to orient the film, and the conduciveness of the film to thermoforming.

The inventors have now discovered that specific PA66/6 copolymer components, optionally added in certain types, amounts, and ratios, can be utilized in a composition having PA6 as a (major) component, to improve performance in a combination of mechanical properties, e.g., the toughness, e.g., puncture resistance, and/or elongation inter alia, of the composition when formed into a film, e.g., a packaging film. Notably, the importance of the type of PA66/6 copolymer additive and the ratios of the polyamide composition components in enabling advantageous strength characteristics had not been previously appreciated. The improved strength of films produced using the polyamide composition is reflected in, for example, an increase in puncture resistance and impact resistance of the films, as well as in film elongation to break and overall toughness. Other advantageous properties of the provided film include a low heat shrinkage and a reduced modulus that enables efficient stretching and increased stretch ratios. Moreover, because a (major) component of the film is PA6, commonly used film processing conditions remain suitable for use with the provided film. These conditions include film extrusion, stretching, and annealing temperatures, and film stretching and relaxation ratios.

Polymer Films

In one aspect, a polymer film, e.g., a BO or MDO film, is disclosed. The polymer film is a polyamide film that includes a composition of polyamides. Conventional polyamide films typically include PA6 homopolymers with insignificant or no copolyamide content. The copolyamide in the disclosed films has been found to provide for surprising improvements in the resultant film. For example, the polymer films disclosed herein possess several advantageous performance characteristics, e.g., increased puncture resistance, impact resistance, and flexibility, in part due to the presence of PA66/6 copolyamide, in some cases above a specific minimum. Additionally, the PA66/6 copolyamide content of the provided films can improve the film stretch ratios and throughput in processing, and enhance production yields by, for example, minimizing wasteful film breaks during manufacture.

Many types of polymer films are contemplated. Examples include, but are not limited to blown and cast films, as well as orientated versions thereof, e.g., BO and MDO. In some embodiments, the film is a BO polymer film. In some cases, the film is an MDO polymer film. Monaxially oriented films are also contemplated. The films may be made from a polyamide composition, and, in some cases, the polyamide composition may comprise the components mentioned herein.

As used herein, the terms "PA6," "nylon 6," and "polyamide 6" refer to a homopolymer prepared from caprolactam monomer subunits. As used herein, the terms "PA66/ 6," "nylon 66/6," and "polyamide 66/6" refer to a copolymer prepared from hexamethylene diamine and adipic acid monomer subunits and also incorporating caprolactam monomer subunits.

In some embodiments, the concentration of the PA66/6 copolymer in the provided polymer film (or in the polyamide composition from which the film is made) can range, for example, from 14 wt % to 100 wt %, e.g., from 14 wt % to 66 wt %, from 14 wt % to 86 wt %, from 15 wt % to 85 wt %, from 30 wt % to 85 wt %, from 15 wt % to 70 wt %, from 23 wt % to 74 wt %, from 31 wt % to 83 wt %, from 40 wt % to 91 wt %, or from 49 wt % to 100 wt %. In terms of upper limits, the PA66/6 concentration in the film can be less than (or equal to) 100 wt %, e.g., less than 91 w %, less than 85 wt %, less than 83 wt %, less than 74 wt %, less than 70 wt %; less than 66 wt %, less than 57 wt %, less than 48 wt %, less than 40 wt %, less than 31 wt %, or less than 22 wt %. In terms of lower limits, the PA66/6 concentration in the film can be greater than 14 wt %, e.g., greater than 23 wt %, greater than 31 wt %, greater than 40 wt %, greater than 48 wt %, greater than 57 wt %, greater than 66 wt %, greater than 74 wt %, greater than 83 wt %, or greater than 91 wt %. Lower concentrations, e.g., less than 14 wt %, are also contemplated. Other ranges/limits based on the Examples are contemplated.

In some embodiments, the concentration of the PA66/6 copolymer in the provided polymer film can be selected to balance improved film strength associated with increasing PA66/6 content, and improved film cost reduction associated with increasing PA6 content. The PA66/6 concentration in the film can range, for example, from 15 wt % to 45 wt %, e.g., from 15 wt % to 33 wt %, from 18 wt % to 36 wt %, from 21 wt % to 39 wt %, from 24 wt % to 42 wt %, or from 27 wt % to 45 wt %. In terms of upper limits, the PA66/6 concentration in the film can be less than 45 wt %, e.g., less than 42 wt %, less than 39 wt %, less than 36 wt %, less than 33 wt %, less than 30 wt %, less than 27 wt %, less than 24 wt %, less than 21 wt %, or less than 18 wt %. In terms of lower limits, the PA66/6 concentration in the film can be greater than 15 wt %, e.g., greater than 15 wt %, greater than 18 wt %, greater than 21 wt %, greater than 24 wt %, greater than 27 wt %, greater than 30 wt %, greater than 33 wt %, greater than 36 wt %, greater than 39 wt %, or greater than 42 wt %.

In some cases, other combinations of PA are also contemplated, e.g., polyamides other than the PA66/6 copolymer and the PA6 polymer.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

The concentration of the PA6 polymer in the provided polymer film can range, for example, from 0 to 86 wt %, e.g., from 0 to 52 wt %, from 9 wt % to 60 wt %, from 17 wt % to 69 wt %, from 14 wt % to 100 wt %, from 14 wt % to 66 wt %, from 14 wt % to 86 wt %, from 15 wt % to 85 wt %, from 30 wt % to 85 wt %, from 15 wt % to 70 wt %, from 26 wt % to 77 wt %, or from 34 wt % to 86 wt %. In terms of upper limits, the PA6 concentration in the film can be less than 86 wt %, e.g., less than 77 wt %, less than 69 wt %, less than 60 wt %, less than 52 wt %, less than 43 wt %, less than 34 wt %, less than 26 wt %, less than 17 wt %, or less than 9 wt %. In terms of lower limits, the PA6 concentration in the film can be greater than 9 wt %, e.g., greater than 17 wt %, greater than 26 wt %, greater than 34 wt %, greater than 43 wt %, greater than 52 wt %, greater than 60 wt %, greater than 69 wt %, or greater than 77 wt %. Higher concentrations, e.g., greater than 86 wt %, are also contemplated. Other ranges/limits based on the Examples are contemplated.

The concentration of the PA6 polymer in the provided polymer film can range, for example, from 55 wt % to 85 wt %, e.g., from 55 wt % to 85 wt %, from 55 wt % to 73 wt %, from 58 wt % to 76 wt %, from 61 wt % to 79 wt %, from 64 wt % to 82 wt %, or from 67 wt % to 85 wt %. In terms of upper limits, the PA6 concentration in the film can be less than 85 wt %, e.g., less than 85 wt %, less than 82 wt %, less than 79 wt %, less than 76 wt %, less than 73 wt %, less than 70 wt %, less than 67 wt %, less than 64 wt %, less than 61 wt %, or less than 58 wt %. In terms of lower limits, the PA6 concentration in the film can be greater than 55 wt %, e.g., greater than 58 wt %, greater than 61 wt %, greater than 64 wt %, greater than 67 wt %, greater than 70 wt %, greater than 73 wt %, greater than 76 wt %, greater than 79 wt %, or greater than 82 wt %.

The weight ratio of the PA6 polymer to the PA66/6 copolymer in the provided polyamide composition can range, for example, from 0.01:1 to 6.2:1, e.g., from 0.01:1 to 0.48:1, from 0.02:1 to 0.9:1, from 0.04:1 to 1.7:1, from 0.07:1 to 3.3:1, or from 0.13:1 to 6.2:1. The weight ratio of the PA6 polymer to the PA66/6 copolymer in the provided polyamide composition can range, for example, from 1:1 to 6:1, e.g., from 1:1 to 4:1, from 1.5:1 to 4.5:1, from 2:1 to 5:1, from 2.5:1 to 5.5:1, or from 3:1 to 6:1. In terms of upper limits, the weight ratio of the PA6 to the PA66/6 can be less than 6.2:1, e.g., less than 5.5:1, less than 5:1, less than 4.5:1, less than 4:1, less than 3.5:1, less than 3:1, less than 2.5:1, less than 2:1, less than 1.5:1, less than 0.9:1, less than 0.47:1, less than 0.25:1, less than 0.13:1, less than 0.07:1, less than 0.04:1, or less than 0.02:1. In terms of lower limits, the weight ratio of the PA6 to the PA66/6 can be greater than 0.01:1, e.g., greater than 0.02:1, greater than 0.04:1, greater than 0.07:1, greater than 0.13:1, greater than 0.25:1, greater than 0.47:1, greater than 0.9:1, greater than 1:1, greater than 1.5:1, greater than 2:1, greater than 2.5:1, greater than 3:1, greater than 3.5:1, greater than 4:1, greater than 4.5:1, greater than 5:1, or greater than 5.5:1. Higher weight ratios, e.g., greater than 6.2:1, and lower weight ratios, e.g., less than 0.01:1, are also contemplated.

In some cases, caprolactam is present in the polyamide composition in the form of subunits of the PA6 polymer, subunits of the PA66/6 copolymer (see discussion below), and optionally in the form of subunits of one or more additional polyamide components of the composition. In some embodiments, the makeup of the polyamide composition is selected to provide a total combined caprolactam content within a specified target range. The concentration of total caprolactam units in the provided polyamide composition, e.g., from all caprolactam sources combined, can range, for example, from 10 wt % to 90 wt %, e.g., from 10 wt % to 58 wt %, from 18 wt % to 66 wt %, from 26 wt % to 74 wt %, from 34 wt % to 82 wt %, or from 42 wt % to 90 wt %. The total caprolactam concentration in the polyamide composition can range from 55 wt % to 90 wt %, e.g., from 55 wt % to 76 wt %, from 58.5 wt % to 79.5 wt %, from 62 wt % to 83 wt %, from 65.5 wt % to 86.5 wt %, or from 69 wt % to 90 wt %. In terms of upper limits, the caprolactam concentration in the polyamide composition can be less than 90 wt %, e.g., less than 86.5 wt %, less than 83 wt %, less than 79.5 wt %, less than 76 wt %, less than 72.5 wt %, less than 69 wt %, less than 65.5 wt %, less than 62 wt %, less than 58.5 wt %, less than 50 wt %, less than 42 wt %, less than 34 wt %, less than 26 wt %, or less than 18 wt %. In terms of lower limits, the caprolactam concentration in the polyamide composition can be greater than 10 wt %, e.g., greater than 18 wt %, greater than 26 wt %, greater than 34 wt %, greater than 42 wt %, greater than 50 wt %, greater than 55 wt %, greater than 58.5 wt %, greater than 62 wt %, greater than 65.5 wt %, greater than 69 wt %, greater than 72.5 wt %, greater than 76 wt %, greater than 79.5 wt %, greater than 83 wt %, or greater than 86.5 wt %. Higher caprolactam concentrations, e.g., greater than 90 wt %, and lower caprolactam concentrations, e.g., less than 10 wt %, are also contemplated. The use of these amounts of caprolactam has unexpectedly been found to lead to the advantageous combination of performance features because the film is able to derive the strength and economic benefits associated with caprolactam units without needing to include a polyamide composition consisting only of PA6 homopolymer.

The weight ratio of the total caprolactam units in the polyamide composition to the total adipic acid-hexamethylene diamine units in the polyamide composition can range, for example, from 0.1:1 to 9:1, e.g., from 0.1:1 to 1.5:1, from 0.16:1 to 2.3:1, from 0.25:1 to 3.7:1, from 0.39:1 to 5.7:1, or from 0.6:1 to 9:1. The weight ratio of total caprolactam units to total adipic acid-hexamethylene diamine units in the polyamide composition can range from 1:1 to 9:1, e.g., from 1:1 to 5.8:1, from 1.8:1 to 6.6:1, from 2.6:1 to 7.4:1, from 3.4:1 to 8.2:1, or from 4.2:1 to 9:1. In terms of upper limits, the weight ratio of caprolactam units to adipic acid-hexamethylene diamine units in the polyamide composition can be less than 9:1, e.g., less than 8.2:1, less than 7.4:1, less than 6.6:1, less than 5.8:1, less than 5:1, less than 4.2:1, less than 3.4:1, less than 2.6:1, less than 1.8:1, less than 1.5:1, less than 0.95:1, less than 0.6:1, less than 0.39:1, less than 0.25:1, or less than 0.16:1. In terms of lower limits, the weight ratio of caprolactam units to adipic acid-hexamethylene diamine units in the polyamide composition can be greater than 0.1:1, e.g., greater than 0.16:1, greater than 0.25:1, greater than 0.39:1, greater than 0.6:1, greater than 0.95:1, greater than 1.5:1, 1:1, greater than 1.8:1, greater than 2.6:1, greater than 3.4:1, greater than 4.2:1, greater than 5:1, greater than 5.8:1, greater than 6.6:1, greater than 7.4:1, or greater than 8.2:1. Higher weight ratios, e.g., greater than 9:1, and lower weight ratios, e.g., less than 0.1:1, are also contemplated.

In some cases, the film may comprise adipic acid units in an amount ranging from 10 wt % to 60 wt %, e.g., from 15 wt % to 55 wt %, from 20 wt % to 50 wt %, from 25 wt % to 45 wt %, or from 30 wt % to 36 wt %. In terms of lower limits, the film may comprise greater than 10 wt % adipic acid units, e.g., greater than 15 wt %, greater than 20 wt %, greater than 25 wt % or greater than 30 wt %. In terms of upper limits, the film may comprise less than 60 wt % adipic acid units, e.g., less than 55 wt %, less than 50 wt %, less than 45 wt % or less than 36 wt %.

The film may comprise hexamethylene diamine units in amounts similar to those disclosed for adipic acid units.

In some cases, the film may comprise caprolactam units in an amount ranging from 10 wt % to 70 wt %, e.g., from 15 wt % to 65 wt %, from 20 wt % to 60 wt %, from 20 wt % to 50 wt %, or from 28 wt % to 40 wt %. In terms of lower limits, the film may comprise greater than 10 wt % caprolactam units, e.g., greater than 10 wt %, greater than 15 wt %, greater than 20 wt % or greater than 28 wt %. In terms of upper limits, the film may comprise less than 60 wt % caprolactam units, e.g., less than 70 wt %, less than 65 wt %, less than 60 wt %, less than 50 wt %, or less than 40 wt %.

The polymer film, or the polymer composition itself, may advantageously have a high heat deflection temperature. For example the polymer film may have a heat deflection temperature greater than 190° C., e.g., greater than 215° C., greater than 220° C., greater than 222° C., greater than 225° C., greater than 227° C., greater than 230° C., greater than 232° C., greater than 235° C., greater than 240° C., greater than 245° C., greater than 250° C., or greater than 255° C. In terms of ranges, the polymer film may have a heat deflection temperature ranging from 190° C. to 300° C., e.g., 215° C. to 260° C., from 220° C. to 260° C., from 225° C. to 255° C., from 225° C. to 250° C., from 230° C. to 250° C., from 235° C. to 250° C., or from 235° C. to 245° C.

In some cases, the polymer film, or the polymer composition itself, may advantageously have a melting point. For example the polymer film may have a melting point greater than 220° C., e.g., greater than 222° C., greater than 225° C., greater than 227° C., greater than 230° C., greater than 232° C., greater than 235° C., greater than 240° C., greater than 245° C., greater than 250° C., or greater than 255° C. In terms of ranges, the polymer film may have a melting point ranging from 215° C. to 260° C., e.g., from 220° C. to 260° C., from 225° C. to 255° C., from 225° C. to 250° C., from 230° C. to 250° C., from 235° C. to 250° C., or from 235° C. to 245° C.

In some cases the melting point of the polymer composition (or in one or more of the components thereof) contributes, at least in part, to the improvements in heat deflection temperature.

The disclosed films may be characterized by the heat deflection temperature and/or the melting point. In some cases, the disclosed films may be characterized by the heat deflection temperature and/or the melting point, irrespective of the compositional make-up of the film or the polymer composition of which the film is made.

In addition to the compositional make-up of the polyamide composition, it has also been discovered that the relative viscosities of the one or more component polymers and copolymers can provide surprising benefits, both in performance and processing. For example, if the relative viscosity of the polyamide composition is within certain ranges and/or limits, production rates and strength are improved. As described herein, "relative viscosity" or "RV" refers to a comparison of the viscosity of a solution of polymer in formic acid with the viscosity of the formic acid itself, and is measured using 90% formic acid and glass capillary Ubbelohde viscometers according to the standard test method ASTM D789-19 (2019).

The provided polyamide compositions can have a relative viscosity that ranges, for example, from 60 to 250, e.g., from 60 to 174, from 79 to 193, from 98 to 212, from 117 to 231, or from 136 to 250. The polyamide compositions can have a relative viscosity that ranges from 100 to 200, e.g., from 100 to 160, from 110 to 170, from 120 to 180, from 130 to 190, or from 140 to 200. The polyamide composition can have a relative viscosity that ranges from 130 to 170, e.g., from 130 to 154, from 134 to 158, from 138 to 162, from 142 to 166, or from 146 to 170. The polyamide compositions can have a relative viscosity that ranges from 80 to 110, e.g., from 80 to 98, from 83 to 101, from 86 to 104, from 89 to 107, or from 92 to 110. The polyamide compositions can have a relative viscosity from 90 to 100, e.g., from 90 to 96, from 91 to 97, from 92 to 98, from 93 to 99, or from 94 to 100. In terms of upper limits, the polyamide composition relative viscosity can be less than 250, e.g., less than 231, less than 212, less than 193, less than 180, less than 174, less than 170, less than 166, less than 162, less than 158, less than 154, less than 150, less than 146, less than 142, less than 138, less than 134, less than 130, less than 120, less than 110, less than 107, less than 104, less than 101, less than 100, less than 99, less than 98, less than 97, less than 96, less than 95, less than 94, less than 93, less than 92, less than 91, less than 90, less than 89, less than 86, less than 83, less than 80, or less than 76. In terms of lower limits, the polyamide composition relative viscosity can be greater than 60, e.g., greater than 76, greater than 80, greater than 83, greater than 86, greater than 89, greater than 90, greater than 91, greater than 92, greater than 93, greater than 94, greater than 95, greater than 96, greater than 97, greater than 98, greater than 99, greater than 100, greater than 101, greater than 104, greater than 107, greater than 110, greater than 120, greater than 130, greater than 134, greater than 138, greater than 142, greater than 146, greater than 150, greater than 154, greater than 158, greater than 162, greater than 166, greater than 170, greater than 174, greater than 180, greater than 193, greater than 212, or greater than 231. Higher relative viscosities, e.g., greater than 250, and lower relative viscosities, e.g., less than 60, are also contemplated.

The enhanced mechanical properties of the provided polymer film permit the film to exhibit desired strengths at a reduced film thickness. Stated another way, the disclosed films provide superior film performance even when the film is thinner. Accordingly, material costs can be reduced while maintaining excellent puncture resistance and impact resistance properties advantageous in, for example, packaging applications. The provided film can have a thickness ranging, for example, from 5 microns to 40 microns, e.g., from 5 microns to 26 microns, from 8.5 microns to 29.5 microns, from 12 microns to 33 microns, from 15.5 microns to 36.5 microns, or from 19 microns to 40 microns. In terms of upper limits, the film thickness can be less than 40 microns, e.g., less than 36.5 microns, less than 33 microns, less than 29.5 microns, less than 26 microns, less than 22.5 microns, less than 19 microns, less than 15.5 microns, less than 12 microns, or less than 8.5 microns. In terms of lower limits, the film thickness can be greater than 5 microns, e.g., greater than 8.5 microns, greater than 12 microns, greater than 15.5 microns, greater than 19 microns, greater than 22.5 microns, greater than 26 microns, greater than 29.5 microns, greater than 33 microns, or greater than 36.5 microns. Larger thicknesses, e.g., greater than 40 microns, and smaller thicknesses, e.g., less than 5 microns, are also contemplated.

In some cases, the disclosed polymer films beneficially have relative viscosities greater than 0.5. e.g., greater than 0.7, greater than 1.0, greater than 1.5, greater than 2.0, greater than 2.5, greater than 3.0, greater than 3.2, or greater than 3.5. In terms of ranges, the films may have a relative viscosity ranging from 0.5 to 10.0, e.g., from 0.5 to 8.0, from 0.5 to 5.0, from 1.0 to 6.0, from 1.0 to 5.0, from 2.0 to 6.0, or from 2.5 to 5.0.

PA66/6 Copolymer

The PA66/6 copolymer additive of the provided polymer film can be selected to have a makeup of component subunit monomers and blocks as described herein, to impart the desired toughness to the film without diminishing film properties associated with high processability. In some embodiments, the PA66/6 copolymer is a statistical copolymer, i.e., PA66-s-6, having statistically defined amounts of component subunits. As used herein, the term "statistical copolymer" refers to a copolymer formed of units that are statistically reacted together and thereby distributed in the copolymer backbone.

The concentration of the adipic acid-hexamethylene diamine units in the PA66/6 copolymer of the provided polyamide compositions can be, for example, between 70 wt % and 100 wt %, e.g., between 70% and 88 wt %, between 75 wt % and 85 wt %, between 73 wt % and 91 wt %, between 76 wt % and 94 wt %, between 79 wt % and 97 wt %, or between 82 wt % and 100 wt %. The adipic acid-hexamethylene diamine concentration in the PA66/6 copolymer can range, for example, from 75 wt % to 85 wt %, e.g., from 75 wt % to 81 wt %, from 76 wt % to 82 wt %, from 77 wt % to 83 wt %, from 78 wt % to 84 wt %, or from 79 wt % to 85 wt %. In terms of lower limits, the adipic acid-hexamethylene diamine concentration in the PA66/6 copolymer can be greater than 70 wt %, e.g., greater than 73 wt %, greater than 75 wt %, greater than 76 wt %, greater than 77 wt %, greater than 78 wt %, greater than 79 wt %, greater than 80 wt %, greater than 81 wt %, greater than 82 wt %, greater than 83 wt %, greater than 84 wt %, greater than 85 wt %, greater than 88 wt %, greater than 91 wt %, greater than 94 wt %, or greater than 97 wt %. In terms of upper limits, the adipic acid-hexamethylene diamine concentration in the PA66/6 copolymer can be less than 100 wt %, e.g., less than 97 wt %, less than 94 wt %, less than 91 wt %, less than 88 wt %, less than 85 wt %, less than 84 wt %, less than 83 wt %, less than 82 wt %, less than 81 wt %, less than 80 wt %, less than 79 wt %, less than 78 wt %, less than 77 wt %, less than 76 wt %, less than 75 wt %, or less than 73 wt %. Lower adipic acid-hexamethylene diamine concentrations, e.g., less than 70 wt %, are also contemplated.

The concentration of the caprolactam units in the PA66/6 copolymer of the provided polyamide compositions can be, for example, between 0 and 30 wt %, e.g., between 0 and 18 wt %, between 3 wt % and 21 wt %, between 6 wt % and 24 wt %, between 9 wt % and 27 wt %, or between 12 wt % and 30 wt %. The caprolactam concentration in the PA66/6 copolymer can range, for example, from 15 wt % to 25 wt %, e.g., from 15 wt % to 21 wt %, from 16 wt % to 22 wt %, from 17 wt % to 23 wt %, from 18 wt % to 24 wt %, or from 19 wt % to 25 wt %. In terms of upper limits, the caprolactam concentration in the PA66/6 copolymer can be less than 30 wt %, e.g., less than 27 wt %, less than 25 wt %, less than 24 wt %, less than 23 wt %, less than 22 wt %, less than 21 wt %, less than 20 wt %, less than 19 wt %, less than 18 wt %, less than 17 wt %, less than 16 wt %, less than 15 wt %, less than 12 wt %, less than 9 wt %, less than 6 wt %, or less than 3 wt %. In terms of lower limits, the caprolactam concentration in the PA66/6 copolymer can be greater than 3 wt %, e.g., greater than 6 wt %, greater than 9 wt %, greater than 12 wt %, greater than 15 wt %, greater than 16 wt %, greater than 17 wt %, greater than 18 wt %, greater than 19 wt %, greater than 20 wt %, greater than 21 wt %, greater than 22 wt %, greater than 23 wt %, greater than 24 wt %, greater than 25 wt %, or greater than 27 wt %. Higher caprolactam concentrations, e.g., greater than 30 wt %, are also contemplated.

In some cases, the polymer composition may comprise additional polymers/copolymers (see discussion below). In some embodiments, the concentration of total caprolactam units in the non-PA6 polymers (all polymers other than PA-6 present in the composition, including PA66/6 copolymer and optional additional polymers/copolymers) can be between 0 and 50 wt %, e.g., between 5 wt % and 40 wt %, between 10 wt % and 35 wt %, between 10 wt % and 30 wt %, between 10 wt % and 25 wt %, or between 15 wt % and 30 wt %. In terms of upper limits, the caprolactam concentration in the non-PA6 polymers can be less than 50 wt %, e.g., less than 45 wt %, less than 40 wt %, less than 35 wt %, less than 30 wt %, less than 25 wt %, less than 20 wt %, less than 15 wt %, less than 10 wt %, or less than 5 wt %, less than 17 wt %. In terms of lower limits, the caprolactam concentration in the PA66/6 copolymer can be greater than 0 wt %, e.g., greater than 3 wt %, greater than 5 wt %, greater than 8 wt %, greater than 10 wt %, greater than 12 wt %, greater than 15 wt %, greater than 18 wt %, greater than 20 wt %, greater than 22 wt %, greater than 25 wt %, greater than 27 wt %, greater than 30 wt %, or greater than 35 wt %. The aforementioned ranges and limits for caprolactam concentration in the PA66/6 copolymer are also applicable here.

The weight ratio of adipic acid-hexamethylene diamine units to caprolactam units in the PA66/6 copolymer of the provided polyamide composition can range, for example, from 2:1 to 19:1, e.g., from 2:1 to 12.2:1, from 3.7:1 to 13.9:1, from 5.4:1 to 15.6:1, from 7.1:1 to 17.3:1, or from 8.8:1 to 19:1. In terms of upper limits, the weight ratio of the adipic acid-hexamethylene diamine units to the caprolactam units in the PA66/6 copolymer can be less than 19:1, e.g., less than 17.3:1, less than 15.6:1, less than 13.9:1, less than 12.2:1, less than 10.5:1, less than 8.8:1, less than 7.1:1, less than 5.4:1, or less than 3.7:1. In terms of lower limits, the weight ratio of the adipic acid-hexamethylene diamine units to the caprolactam units in the PA66/6 copolymer can be greater than 2:1, e.g., greater than 3.7:1, greater than 5.4:1, greater than 7.1:1, greater than 8.8:1, greater than 10.5:1, greater than 12.2:1, greater than 13.9:1, greater than 15.6:1, greater than 17.3:1. Higher ratios, e.g., greater than 19:1, and lower ratios, e.g., less than 2:1, are also contemplated.

It can be beneficial for the PA66/6 copolyamide additive to have a relatively high melting point, providing the oriented film with advantageous characteristics that can include reduced burn-through potential and enhanced clarity and transparency. The PA66/6 copolymer of the provided polyamide compositions can have a melting point ranging, for example, from 200° C. to 260° C., e.g., from 200° C. to 255° C., from 200° C. to 233° C., from 205.5° C. to 238.5° C., from 211° C. to 244° C., from 216.5° C. to 249.5° C., from 220° C. to 260° C., or from 222° C. to 255° C. The PA66/6 copolymer melting point can range, for example, from 215° C. to 223° C., e.g., from 215° C. to 219.8° C., from 215.8° C. to 220.6° C., from 216.6° C. to 221.4° C., from 217.4° C. to 222.2° C., or from 218.2° C. to 223° C. The PA66/6 copolymer melting point can range, for example, from 230° C. to 238° C., e.g., from 230° C. to 234.8° C., from 230.8° C. to 235.6° C., from 231.6° C. to 236.4° C., from 232.4° C. to 237.2° C., or from 233.2° C. to 238° C. In terms of upper limits, the PA66/6 copolymer melting point can be less than 255° C., e.g., less than 249.5° C., less than 244° C., less than 238° C., less than 237.2° C., less than 236.4° C., less than 235.6° C., less than 234.8° C., less than 234° C., less than 233.2° C., less than 232.4° C., less than 231.6° C., less than 230.8° C., less than 230° C., less than 227.5° C., less than 225° C., less than 223° C., less than 222.2. ° C., less than 221.4° C., less than 220.6° C., less than 219.8° C., less than 219° C., less than 218.2° C., less than 217.4° C., less than 216.6° C., less than 215.8° C., less than 211° C., or less than 205.5° C. In terms of lower limits, the PA66/6 copolymer melting point can be greater than 200° C., e.g., greater than 205.5° C., greater than 211° C., greater than 215.8° C., greater than 216.6° C., greater than 217.4° C., greater than 218.2° C., greater than 219° C., greater than 219.8° C., greater than 220.0° C., greater than 220.6° C., greater than 221.4° C., greater than 222.2° C., greater than 223° C., greater than 225° C., greater than 227.5° C., greater than 230° C., greater than 230.8° C., greater than 231.6° C., greater than 232.4° C., greater than 233.2° C., greater than 234° C., greater than 234.8° C., greater than 235.6° C., greater than 236.4° C., greater than 237.2° C., greater than 238° C., greater than 244° C., or greater than 249.5° C. Higher melting temperatures, e.g., greater than 255° C., and lower melting temperatures, e.g., less than 200° C., are also contemplated.

The PA66/6 copolyamide may have a relatively high heat deflection temperature, which may contribute to the performance features. For example, the PA66/6 copolyamide may have heat deflection temperature greater than 190° C., e.g., greater than 215° C., greater than 220° C., greater than 222° C., greater than 225° C., greater than 227° C., greater than 230° C., greater than 232° C., greater than 235° C., greater than 240° C., greater than 245° C., greater than 250° C., or greater than 255° C. In terms of ranges, the PA66/6 copolyamide may have a heat deflection temperature ranging from 190° C. to 300° C., e.g., 215° C. to 260° C., from 220° C. to 260° C., from 225° C. to 255° C., from 225° C. to 250° C., from 230° C. to 250° C., from 235° C. to 250° C., or from 235° C. to 245° C.

Other Additives

In some embodiments, the provided polymer film includes one more heat stabilizers. The one or more heat stabilizers of the film can be selected to improve performance, e.g., at higher operating temperatures, without significantly negatively affecting the strength of the material. At least one of the heat stabilizers can include copper. In some embodiments, all heat stabilizers of the film include copper. Copper stabilizers suitable for use as components of the provided film include copper halides, e.g., chlorides, bromides, iodides, or combinations thereof. Copper stabilizers also can include copper cyanide, copper oxide, copper sulfate, copper phosphate, copper acetate, copper propionate, copper benzoate, copper adipate, copper terephthalate, copper isophthalate, copper salicylate, copper nicotinate, copper stearate, copper complex salts coordinated to a chelating amine such as ethylenediamine and ethylenediaminetetraacetic acid, and combinations thereof.

In some embodiments, at least a portion of the copper in the polymer film is in the form of copper iodide:potassium iodide having a mass ratio ranging from 1:4 to 1:10, e.g., from 1:4 to 1:7.6, from 1:4.6 to 1:8.2, from 1:5.2 to 1:8.8, from 1:5.8 to 1:9.4, or from 1:6.4 to 1:10. In terms of upper limits, the copper iodide:potassium iodide mass ratio can be less than 1:10, e.g., less than 1:9.4, less than 1:8.8, less than 1:8.2, less than 1:7.6, less than 1:7, less than 1:6.4, less than 1:5.8, less than 1:5.2, or less than 1:4.6. In terms of lower limits, the copper iodide:potassium iodide mass ratio can be greater than 1:4, e.g., greater than 1:4.6, greater than 1:5.2, greater than 1:5.8, greater than 1:6.4, greater than 1:7, greater than 1:7.6, greater than 1:8.2, greater than 1:8.8, or greater than 1:9.4. Higher mass ratios, e.g., greater than 1:10, and lower mass ratios, e.g., less than 1:4, are also contemplated.

In some embodiments, the overall concentration of copper in the provided polymer film ranges from 30 ppm to 500 ppm, e.g., from 30 ppm to 160 ppm, from 40 ppm to 210 ppm, from 53 ppm to 280 ppm, from 70 ppm to 380 ppm, or from 92 ppm to 500 ppm. In terms of upper limits, the film copper concentration can be less than 500 ppm, e.g., less than 380 ppm, less than 280 ppm, less than 210 ppm, less than 160 ppm, less than 120 ppm, less than 92 ppm, less than 70 ppm, less than 53 ppm, or less than 40 ppm. In terms of lower limits, the film copper concentration can be greater than 30 ppm, e.g., greater than 40 ppm, greater than 53 ppm, greater than 70 ppm, greater than 92 ppm, greater than 120 ppm, greater than 160 ppm, greater than 210 ppm, greater than 280 ppm, or greater than 380 ppm. Higher concentrations, e.g., greater than 500 ppm, and lower concentrations, e.g., less than 30 ppm, are also contemplated.

In some embodiments, the provided polymer film includes one or more lubricants selected to serve as processing aids for the film. The type and relative amount of lubricant can be selected to improve processing of the composition, and to contribute to the high strength of the film material. In some embodiments, the lubricant includes a wax. In some embodiments, the lubricant consists of a wax. In some embodiments, the wax includes a fatty acid. In some embodiments, the lubricant consists of a fatty acid. In some embodiments, the wax includes a saturated fatty acid. In some embodiments, the lubricant consists of a saturated fatty acid. In some embodiments, the wax includes stearic acid, behenic acid, or salts or combinations thereof. In some embodiments, the lubricant consists of stearic acid, behenic acid, or salts or combinations thereof. The stearate lubricant can include, for example, zinc stearate calcium stearate, aluminum distearate, zinc stearate, and/or calcium stearate.

The overall concentration of lubricants in the film can range, for example, from 50 ppm to 5000 ppm, e.g., from 50 ppm to 790 ppm, from 79 ppm to 1300 ppm, from 130 ppm to 2000 ppm, from 200 ppm to 3200 ppm, or from 320 ppm to 5000 ppm. In terms of upper limits, the lubricant concentration can be less than 5000 ppm, e.g., less than 3200 ppm, less than 2000 ppm, less than 1300 ppm, less than 790 ppm, less than 500 ppm, less than 320 ppm, less than 200 ppm, less than 130 ppm, or less than 79 ppm. In terms of lower limits, the lubricant concentration can be greater than 50 ppm, e.g., greater than 79 ppm, greater than 130 ppm, greater than 200 ppm, greater than 320 ppm, greater than 500 ppm, greater than 790 ppm, greater than 1300 ppm, greater than 2000 ppm, or greater than 3200 ppm. Higher concentrations, e.g., greater than 5000 ppm, and lower concentrations, e.g., less than 50 ppm, are also contemplated.

In some embodiments, the provided polymer film includes one or more anti-blocking agents selected to prevent the film from self-sticking when, for example, wound tightly onto a roll. Typically, the agents are added to lower the surface energy of the film or to create nanoscale bumps that reduce the coefficient of friction of the film surface. Additionally, anti-block agents can equilibrate film flow and stretching stability during film processing. Anti-blocking agents suitable for use with the provided film can include, for example, inorganic solids such as in the form of diatomaceous earth. The diatomaceous earth can include, for example, talc, calcium carbonate, silicon dioxide, magnesium silicate, sodium silicate, aluminum silicate, aluminum potassium silicate, or a combination thereof.

The concentration of diatomaceous earth in the film can range, for example, from 10 ppm to 1000 ppm, e.g., from 10 ppm to 160 ppm, from 16 ppm to 250 ppm, from 25 ppm to 400 ppm, from 40 ppm to 630 ppm, or from 63 ppm to 1000 ppm. In terms of upper limits, the diatomaceous earth concentration can be less than 1000 ppm, e.g., less than 630 ppm, less than 400 ppm, less than 250 ppm, less than 160 ppm, less than 100 ppm, less than 63 ppm, less than 40 ppm, less than 25 ppm, or less than 16 ppm. In terms of lower limits, the diatomaceous earth concentration can be greater than 10 ppm, e.g., greater than 16 ppm, greater than 25 ppm, greater than 40 ppm, greater than 63 ppm, greater than 100 ppm, greater than 160 ppm, greater than 250 ppm, greater than 400 ppm, or greater than 630 ppm. Higher concentrations, e.g., greater than 1000 ppm, and lower concentrations, e.g., less than 10 ppm, are also contemplated.

In some embodiments, the anti-block agents of the provided polymer film can include one or more synthetic waxes such as, for example, N,N'-ethylene bis(stearamide), stearyl erucamide, glycerol monostearate, zinc stearate, aluminum distearate, calcium stearate, or a combination thereof. The overall concentration of synthetic wax anti-blocking agents in the film can range, for example, from 200 ppm to 5000 ppm, e.g., from 200 ppm to 1400 ppm, from 280 ppm to 1900 ppm, from 380 ppm to 2600 ppm, from 530 ppm to 3600 ppm, or from 720 ppm to 5000 ppm. In terms of upper limits, the synthetic wax anti-blocking agent concentration can be less than 5000 ppm, e.g., less than 3600 ppm, less than 2600 ppm, less than 1900 ppm, less than 1400 ppm, less than 1000 ppm, less than 720 ppm, less than 530 ppm, less than 380 ppm, or less than 280 ppm. In terms of lower limits, the synthetic wax anti-blocking agent concentration can be greater than 200 ppm, e.g., greater than 280 ppm, greater than 380 ppm, greater than 530 ppm, greater than 720 ppm, greater than 1000 ppm, greater than 1400 ppm, greater than 1900 ppm, greater than 2600 ppm, or greater than 3600 ppm. Higher concentrations, e.g., greater than 5000 ppm, and lower concentrations, e.g., less than 200 ppm, are also contemplated.

In some embodiments, the provided polymer film includes one or more additional copolymers. The additional copolymers can include one or more copolyamides. The additional copolymers can include, for example, PA6,10, PA6,12, PA66/6,10, PA66/6,12, or combinations thereof. As used herein, the terms "PA6,10," "nylon 6,10," and "polyamide 6,10" refer to a copolymer prepared from hexamethylene diamine and sebacic acid monomer subunits. As used, herein, the terms "PA6,12," "nylon 6,12," and "polyamide 6,12" refer to a copolymer prepared from hexamethylene diamine and dodecanedioic acid monomer subunits. As used herein, the terms "PA66/6,10," "nylon 66/6,10," and "polyamide 66/6,10" refer to a copolymer having chains prepared from hexamethylene diamine and adipic acid monomer units and incorporating chains prepared from hexamethylene diamine and sebacic acid monomer units. In some embodiments, PA66/6,10 refers to a combination of PA66 units and PA6,10 units in a statistical copolymer, i.e., PA66-s-6,10. In some embodiments, PA66/6,12 refers to a combination of PA66 units and PA6,12 units in a statistical polymer, i.e., PA66-s-6,12.

Performance Characteristics

The puncture resistance of a material, e.g., a polymer film, is a measure of the force required to penetrate that material. It can be beneficial for polymeric films to have high puncture resistances, particularly when used in packaging applications, because packaging films are often subject to damage by penetration from package contents, or from forces external to the packaging, e.g., forces that often occur during shipping and handling. Such damage can lead to the undesired losses of barrier properties, package integrity, or product appearance. The polymer films disclosed herein can beneficially demonstrate increased puncture resistance relative to conventional polymer films that include only PA6 in their polyamide composition. Puncture resistance can be measured with, for example, the standard test method ASTM F1306-16 (2016), employing a puncture probe radius of 1 mm.

The provided polymer films can demonstrate a puncture resistance that ranges, for example, from 800 N/mm to 1350 N/mm, e.g., from 825 N/mm to 1150 N/mm, from 850 N/mm to 1150 N/mm, from 850 N/mm to 1075 N/mm, from 900 N/mm to 1200 N/mm, from 950 N/mm to 1250 N/mm, from 1000 N/mm to 1300 N/mm, or from 1050 N/mm to 1350 N/mm. In terms of upper limits, the film puncture resistance can be less than 1350 N/mm, e.g., less than 1300 N/mm, less than 1250 N/mm, less than 1200 N/mm, less than 1150 N/mm, less than 1100 N/mm, less than 1050 N/mm, less than 1000 N/mm, less than 950 N/mm, or less than 900 N/mm. In terms of lower limits, the film puncture resistance can be greater than 800 N/mm, e.g., greater than 825 N/mm, greater than 850M/mm, greater than 900 N/mm, greater than 950 N/mm, greater than 1000 N/mm, greater than 1050 N/mm, greater than 1100 N/mm, greater than 1150 N/mm, greater than 1200 N/mm, greater than 1250 N/mm, or greater than 1300 N/mm. Higher puncture resistances, e.g., greater than 1350 N/mm, and lower puncture resistances, e.g., less than 850 N/mm, are also contemplated.

The strength of a polymer film can also be characterized in terms of its elongation properties. It can be beneficial for polymeric packaging films to have high elongation, e.g., transverse direction elongation, because packaging materials are often subjected to stretching forces that can cause a film with low elongation to tear or rupture. The polymer films disclosed herein can beneficially demonstrate increased elongation relative to conventional polymer films that include only PA6 in their polyamide composition. Elongation can be measured with, for example, the standard test method ASTM D882-18 (2018).

The provided polymer films can demonstrate a transverse direction elongation that ranges, for example, from 85% to 158%, e.g., from 88% to 158%, from 88% to 130%, from 95% to 137%, from 85% to 130%, from 102% to 144%, from 85% to 125%, from 109% to 151%, or from 116% to 158%. In terms of upper limits, the film transverse direction elongation can be less than 158%, e.g., less than 151%, less than 144%, less than 137%, less than 130%, less than 123%, less than 116%, less than 109%, less than 102%, or less than 95%. In terms of lower limits, the film transverse direction elongation can be greater than 85%, e.g., greater than 88%, greater than 90%, greater than 95%, greater than 102%, greater than 109%, greater than 110%, greater than 112%, greater than 116%, greater than 123%, greater than 130%, greater than 137%, greater than 144%, or greater than 151%. Larger elongations, e.g., greater than 158%, and smaller elongations, e.g., less than 88%, are also contemplated. Similar unexpected performance improvements are demonstrated in FIG. 2, which shows the improvements in machine direction, 45°, and 135°. Ranges and limits can be deduced for these metrics by the skilled person, based on the FIGS.

The impact resistance of a film is a measure of the resistance of the film to breakage by shock loading. The polymer films disclosed herein can beneficially demonstrate increased impact resistance relative to conventional polymer films that include only PA6 in their polyamide composition. Impact resistance can be measured with, for example, the standard test method ASTM D1709-16ae1 (2016). The provided polymer films can demonstrate an impact resistance that ranges, for example, from 9.6 N to 19.6 N, e.g., from 9.6 N to 15.6 N, from 10.6 N to 16.6 N, from 11.6 N to 17.6 N, from 12.6 N to 18.6 N, or from 13.6 N to 19.6 N. In terms of upper limits, the film impact resistance can be less than 19.6 N, e.g., less than 18.6 N, less than 17.6 N, less than 16.6 N, less than 15.6 N, less than 14.6 N, less than 13.6 N, less than 12.6 N, less than 11.6 N, or less than 10.6 N. In terms of lower limits, the film impact resistance can be greater than 9.6 N, e.g., greater than 10.6 N, greater than 11.6 N, greater than 12.6 N, greater than 13.6 N, greater than 14.6 N, greater than 15.6 N, greater than 16.6 N, greater than 17.6 N, or greater than 18.6 N. Higher impact resistance, e.g., greater than 19.6 N, and lower impact resistances, e.g., less than 9.6 N, are also contemplated.

It can be beneficial for polymeric films to have high tensile strengths, e.g., transverse direction tensile strengths, because of the accompanying resistance of the film to failure resulting from tensile forces. The polymer films disclosed herein can beneficially demonstrate increased tensile strength relative to conventional polymer films that include only PA6 in their polyamide composition. Tensile strengths can be measured with, for example, the standard test method ASTM D882-18 (2018).

The provided polymer films can demonstrate a transverse direction tensile strength that ranges, for example, from 250 MPa to 400 MPa, e.g., from 250 MPa to 340 MPa, from 255 MPa to 340 MPa, from 265 MPa to 355 MPa, from 280 MPa to 370 MPa, from 295 MPa to 385 MPa, or from 310 MPa to 400 MPa. In terms of upper limits, the film transverse direction tensile strength can be less than 400 MPa, e.g., less than 385 MPa, less than 370 MPa, less than 355 MPa, less than 340 MPa, less than 325 MPa, less than 310 MPa, less than 295 MPa, less than 280 MPa, or less than 265 MPa. In terms of lower limits, the film transverse direction tensile strength can be greater than 250 MPa, e.g. greater than 265 MPa, greater than 280 MPa, greater than 295 MPa, greater than 310 MPa, greater than 325 MPa, greater than 340 MPa, greater than 355 MPa, greater than 370 MPa, or greater than 385 MPa. Higher tensile strengths, e.g., greater than 400 MPa, and lower tensile strengths, e.g., less than 250 MPa, are also contemplated. Similar unexpected performance improvements are demonstrated in FIG. 3, which shows the improvements in machine direction, 45°, and 135°. Ranges and limits can be deduced for these metrics by the skilled person, based on the FIGS.

The tensile modulus of a polymer film is a measure of the resistance of the film to stretching forces. It can be beneficial for polymeric films to have low tensile moduli, e.g., transverse direction tensile moduli, because a lower modulus can increase the elasticity of the film and render the film more amenable to processing steps such as film stretching or film thermoforming. The polymer films disclosed herein can beneficially demonstrate decreased tensile moduli relative to conventional polymer films that include only PA6 in their polyamide composition. Tensile moduli can be measured with, for example, the standard test method ASTM D882-18 (2018).

The provided polymer films can demonstrate a transverse direction tensile modulus that ranges, for example, from 2500 MPa to 3800 MPa, e.g., 2500 MPa to 3500 MPa, from 2500 MPa to 3100 MPa, 2900 MPa to 3800 MPa, from 2600 MPa to 3200 MPa, from 2700 MPa to 3300 MPa, from 2800 MPa to 3400 MPa, or from 2900 MPa to 3500 MPa. In terms of upper limits, the film transverse direction tensile modulus can be less than 3800 MPa, e.g., less than 3700 MPa, less than 3600 MPa, less than 3500 MPa, less than 3400 MPa, less than 3300 MPa, less than 3200 MPa, less than 3100 MPa, less than 3000 MPa, less than 2900 MPa, less than 2800 MPa, less than 2700 MPa, or less than 2600 MPa. In term of lower limits, the film transverse direction tensile modulus can be greater than 2500 MPa, e.g., greater than 2600 MPa, greater than 2700 MPa, greater than 2700 MPa, greater than 2800 MPa, greater than 2900 MPa, greater than 3000 MPa, greater than 3100 MPa, greater than 3200 MPa, greater than 3300 MPa, or greater than 3400 MPa. Higher tensile moduli, e.g., greater than 3500 MPa, and lower tensile moduli, e.g., less than 2500 MPa, are also contemplated. Similar unexpected performance improvements are demonstrated in FIG. 4, which shows the improvements in machine direction, 45°, and 135°. Ranges and limits can be deduced for these metrics by the skilled person, based on the FIGS.

It can be beneficial for polymeric films to have low heat shrinkages because this can, for example, assist in maintaining the integrity and shape of packaging materials produced using the films. In particular, polymeric films are often laminated with other components, such as additional polymer films or metallic layers, in multilayer configurations. By minimizing the heat shrinkage of the polymeric films, these films can better preserve their relative position and contact with adjacent layers of laminate structures. The polymer films disclosed herein can beneficially demonstrate decreased heat shrinkage relative to conventional polymer films that include only PA6 in their polyamide composition.

The provided polymer films can demonstrate heat shrinkages (MD or TD) that are, for example, between 0 and 2%, e.g., between 0 and 1.2%, between 0.2% and 1.4%, between 0.4% and 1.6%, between 0.6% and 1.8%, or between 0.8% and 2%. In terms of upper limits, the film heat shrinkage can be less than 2%, e.g., less than 1.8%, less than 1.6%, less than 1.4%, less than 1.2%, less than 1%, less than 0.8%, less than 0.6%, less than 0.4%, or less than 0.2%. In terms of lower limits, the film heat shrinkage can be greater than 0.2%, e.g., greater than 0.4%, greater than 0.6%, greater than 0.8%, greater than 1%, greater than 1.2%, greater than 1.4%, greater than 1.6%, or greater than 1.8%. Higher heat shrinkages, e.g., greater than 2%, and lower heat shrinkages, e.g., less than 2%, are also contemplated.

In some embodiments, the provided polymer film includes from 14 wt % to 46 wt % PA66/6 copolymer, exhibits a puncture resistance ranging from 850 N/mm to 1350 N/m, and exhibits a transverse direction elongation ranging from 88% to 158%. The concentration of the PA66/6 copolymer in the film can range, for example, from 15 wt % to 45 wt %, from 15 wt % to 33 wt %, from 18 wt % to 36 wt %, from 21 wt % to 39 wt %, from 24 wt % to 42 wt %, or from 27 wt % to 45 wt %. The puncture resistance of the film can range, for example, from 850 N/mm to 1150 N/mm, from 900 N/mm to 1200 N/mm, from 950 N/mm to 1250 N/mm, from 1000 N/mm to 1300 N/mm, or from 1050 N/mm to 1350 N/mm. The transverse direction elongation of the film can range, for example, from 88% to 130%, from 95% to 137%, from 102% to 144%, from 109% to 151%, or from 116% to 158%.

In some embodiments, the provided polymer film includes from 14 wt % to 46 wt % PA66/6 copolymer having a caprolactam unit concentration between 0 and 30 wt %, and exhibits an impact resistance ranging from 9.6 N to 19.6 N. The concentration of the PA66/6 copolymer in the film can range, for example, from 15 wt % to 45 wt %, from 15 wt % to 33 wt %, from 18 wt % to 36 wt %, from 21 wt % to 39 wt %, from 24 wt % to 42 wt %, or from 27 wt % to 45 wt %. The concentration of caprolactam units in the PA66/6 copolymer can be, for example, between 0 and 18 wt %, between 3 wt % and 21 wt %, between 6 wt % and 24 wt %, between 9 wt % and 27 wt %, or between 12 wt % and 30 wt %. The impact resistance of the film can range, for example, from 9.6 N to 15.6 N, from 10.6 N to 16.6 N, from 11.6 N to 17.6 N, from 12.6 N to 18.6 N, or from 13.6 N to 19.6 N.

In some embodiments, the provided polymer film includes from 14 wt % to 46 wt % PA66/6 copolymer having a melting point ranging from 200° C. to 255° C., and exhibits a heat shrinkage between 0 and 2%. The concentration of the PA66/6 copolymer in the film can range, for example, from 15 wt % to 45 wt %, from 15 wt % to 33 wt %, from 18 wt % to 36 wt %, from 21 wt % to 39 wt %, from 24 wt % to 42 wt %, or from 27 wt % to 45 wt %. The melting point of the PA66/6 copolymer of the film can range, for example, from 200° C. to 233° C., from 205.5° C. to 238.5° C., from 211° C. to 244° C., from 216.5° C. to 249.5° C., or from 222° C. to 255° C. The heat shrinkage of the film can be, for example, between 0 and 1.2%, between 0.2% and 1.4%, between 0.4% and 1.6%, between 0.6% and 1.8%, or between 0.8% and 2%.

Methods of Preparation

In another aspect, a method of preparing a polymer film is disclosed. The method includes providing a PA6 polymer and a PA66/6 copolymer. These polyamides can be any of those disclosed herein. In some embodiments, the method further includes providing one or more heat stabilizers, lubricants, anti-blocking agents, and/or additional copolymers. In some embodiments, the method further includes selecting the type of PA6 polymer, PA66/6 copolymer, heat stabilizers, lubricants, anti-blocking agents, and/or additional copolymers to provide desired mechanical properties to the resulting polyamide composition.

The method further includes blending the PA6 polymer and the PA66/6 copolymer to create a polyamide composition or mixture having a PA66/6 copolymer concentration that is greater than or equal to 15 wt %. In some embodiments, the presence of the PA66/6 copolymer additive in the polyamide composition of the film results in a slower crystallization observed for the composition. This slower crystallization can in turn provide a larger window of time during which the mixture can be more easily processed in subsequent steps into a film. In some embodiments, the method further includes blending one or more heat stabilizers, lubricants, anti-blocking agents, and/or additional copolymers into the polyamide composition. In some embodiments, the method further includes selecting the amount of PA6 polymer, PA66/6 copolymer, heat stabilizers, lubricants, anti-blocking agents, and/or additional copolymers to provide desired mechanical properties to the resulting polyamide composition. As used herein, the term "blending" is intended to encompass either the addition of the material itself to the composition or the in situ formation of the material in the composition. In some embodiments, two or more materials to be combined with the composition are simultaneously added via masterbatch.

The method further includes casting the created polyamide composition to form a film. In some embodiments, the casting includes extruding the polyamide composition at a selected extrusion temperature. The extrusion temperature can range, for example, from 235° C. to 295° C., e.g., from 235° C. to 271° C., from 241° C. to 277° C., from 247° C. to 283° C., from 253° C. to 289° C., or from 259° C. to 295° C. In terms of upper limits, the extrusion temperature can be less than 295° C., e.g., less than 289° C., less than 283° C., less than 277° C., less than 271° C., less than 265° C., less than 259° C., less than 253° C., less than 247° C., or less than 241° C. In terms of lower limits, the extrusion temperature can be greater than 235° C., e.g., greater than 241° C., greater than 247° C., greater than 253° C., greater than 259° C., greater than 265° C., greater than 271° C., greater than 277° C., greater than 283° C., or greater than 289° C. Higher extrusion temperatures, e.g., greater than 295° C., and lower extrusion temperatures, e.g. less than 235° C., are also contemplated.

The method further includes stretch orienting the formed film, thereby preparing the polymer film. In some embodiments, the stretch orienting includes preheating the formed film for a selected preheating time and at a selected preheating temperature. The preheating time can be selected to be low enough to enable smooth film stretching in subsequent stretching steps. The preheating time can range, for example, from 2 seconds to 10 seconds, e.g., from 2 seconds to 6.8 seconds, from 2.8 seconds to 7.6 seconds, from 3.6 seconds to 8.4 seconds, from 4.4 seconds to 9.2 seconds, or from 5.2 seconds to 10 seconds. In terms of upper limits, the preheating time can be less than 10 seconds, e.g., less than 9.2 seconds, less than 8.4 seconds, less than 7.6 seconds, less than 6.8 seconds, less than 6 seconds, less than 5.2 seconds, less than 4.4 seconds, less than 3.6 seconds, or less than 2.8 seconds. In terms of lower limits, the preheating time can be greater than 2 seconds, e.g., greater than 2.8 seconds, greater than 3.6 seconds, greater than 4.4 seconds, greater than 5.2 seconds, greater than 6 seconds, greater than 6.8 seconds, greater than 7.6 seconds, greater than 8.4 seconds, or greater than 9.2 seconds. Longer preheating times, e.g., greater than 10 seconds, and shorter preheating times, e.g., less than 2 seconds, are also contemplated.

The preheating temperature can be selected to be low enough to minimize both the pre-crystallization of the polyamide composition, and the associated introduction of instabilities into subsequent film stretching steps. The preheating temperature can range, for example, from 35° C. to 115° C., e.g., from 35° C. to 83° C., from 43° C. to 91° C., from 51° C. to 99° C., from 59° C. to 107° C., or from 67° C. to 115° C. In terms of upper limits, the preheating temperature can be less than 115° C., e.g., less than 107° C., less than 99° C., less than 91° C., less than 83° C., less than 75° C., less than 67° C., less than 59° C., less than 51° C., or less than 43° C. In terms of lower limits, the preheating temperature can be greater than 35° C., e.g., greater than 43° C., greater than 51° C., greater than 59° C., greater than 67° C., greater than 75° C., greater than 83° C., greater than 91° C., greater than 99° C., or greater than 107° C. Lower preheating temperatures, e.g., less than 35° C., are also contemplated.

The preheating temperature can alternatively be selected to be high enough to accommodate film production lines having shorter preheating times and/or lower amounts of force. The preheating temperature can range, for example, from 150° C. to 250° C., e.g., from 150° C. to 210° C., e.g., from 160° C. to 220° C., from 170° C. to 230° C., from 180° C. to 240° C., or from 190° C. to 250° C. In terms of upper limits, the preheating temperature can be less than 250° C., e.g., less than 240° C., less than 230° C., less than 220° C., less than 210° C., less than 200° C., less than 190° C., less than 180° C., less than 170° C., or less than 160° C. In terms of lower limits, the preheating temperature can be greater than 150° C., e.g., greater than 160° C., greater than 170° C., greater than 180° C., greater than 190° C., greater than 200° C., greater than 210° C., greater than 220° C., greater than 230° C., or greater than 240° C. Higher preheating temperatures, e.g., greater than 250° C., are also contemplated.

In some embodiments, the stretch orienting includes stretching the formed film at a selected stretching temperature. The stretching temperature can range, for example, from 70° C. to 250° C., e.g., from 70° C. to 178° C., from 88° C. to 196° C., from 106° C. to 214° C., from 124° C. to 232° C., or from 142° C. to 250° C. In terms of upper limits, the stretching temperature can be less than 250° C., e.g., less than 232° C., less than 214° C., less than 196° C., less than 178° C., less than 160° C., less than 142° C., less than 124° C., less than 106° C., or less than 88° C. In terms of lower limits, the stretching temperature can be greater than 70° C., e.g., greater than 88° C., greater than 106° C., greater than 124° C., greater than 142° C., greater than 160° C., greater than 178° C., greater than 196° C., greater than 214° C., or greater than 232° C. Higher stretching temperatures, e.g., greater than 250° C., and lower stretching temperatures. e.g., less than 70° C., are also contemplated.

In some embodiments, the stretch orienting includes stretching the formed film at a selected stretch ratio. The presence of the PA66/6 copolymer additive in the polyamide composition beneficially does not significantly negatively affect the stretch ratio of the polymer film during preparation and processing. The provided polymer film can be oriented by stretching the film in the machine direction at a machine direction stretch ratio ranging, for example, from 3 to 3.8, e.g., from 3 to 3.48, from 3.08 to 3.56, from 3.16 to 3.64, from 3.24 to 3.72, or from 3.32 to 3.8. The film can be stretched at a machine direction stretch ratio ranging from 3.2 to 3.5, e.g., from 3.2 to 3.28, from 3.23 to 3.41, from 3.26 to 3.44, from 3.29 to 3.47, or from 3.32 to 3.5. In terms of upper limits, the machine direction stretch ratio can be less than 3.8, e.g., less than 3.72, less than 3.64, less than 3.56, less than 3.5, less than 3.47, less than 3.44, less than 3.41, less than 3.38, less than 3.35, less than 3.32, less than 3.29, less than 3.26, less than 3.23, less than 3.2, less than 3.16, or less than 3.08. In terms of lower limits, the machine direction stretch ratio can be greater than 3, e.g., greater 3.08, greater than 3.16, greater than 3.2, greater than 3.23, greater than 3.26, greater than 3.29, greater than 3.32, greater than 3.35, greater than 3.38, greater than 3.41, greater than 3.44, greater than 3.47, greater than 3.5, greater than 3.56, greater than 3.64, or greater than 3.72. Higher machine direction stretch ratios, e.g., greater than 3.8, and lower machine direction stretch ratios, e.g., less than 3, are also contemplated.

The provided polymer film can be oriented by stretching the film in the transverse direction at a transverse direction stretch ratio ranging, for example, from 3.1 to 5, e.g., from 3.1 to 4.24, from 3.29 to 4.43, from 3.48 to 4.62, from 3.67 to 4.81, or from 3.86 to 5. The film can be stretched at a transverse direction stretch ratio ranging from 3.3 to 3.7, e.g., from 3.3 to 3.54, from 3.34 to 3.58, from 3.38 to 3.62, from 3.42 to 3.66, or from 3.46 to 3.7. In terms of upper limits, the transverse direction stretch ratio can be less than 5, e.g., less than 4.81, less than 4.62, less than 4.43, less than 4.24, less than 4.09, less than 3.98, less than 3.87, less than 3.76, less than 3.7, less than 3.66, less than 3.62, less than 3.58, less than 3.54, less than 3.5, less than 3.46, less than 3.42, less than 3.38, less than 3.34, less than 3.3, or less than 3.21. In terms of lower limits, the transverse direction stretch ratio can be greater than 3.1, e.g., greater 3.21, greater than 3.3, greater than 3.34, greater than 3.38, greater than 3.42, greater than 3.46, greater than 3.5, greater than 3.54, greater than 3.58, greater than 3.62, greater than 3.66, greater than 3.7, greater than 3.76, greater than 3.87, greater than 3.98, greater than 4.09, greater than 4.24, greater than 4.43, greater than 4.62, or greater than 4.81. Higher transverse direction stretch ratios, e.g., greater than 5, and lower transverse direction stretch ratios, e.g., less than 3.1, are also contemplated.

In some cases, the polymer film is effectively produced via a machine direction relaxation ranging from 0% to 10%, e.g., from 0% to 7%, from 1% to 7%, from 0% to 5%, or from 1% to 5%. In terms of upper limits, the machine direction relaxation may be less than 10%, e.g., less than 7%, less than 5%, or less than 3%.

In some cases, the polymer film is effectively produced via a transverse direction relaxation ranging from 0% to 20%, e.g., from 1% to 15%, from 3% to 15%, from 3% to 12%, or from 5% to 12%. In terms of upper limits, the machine direction relaxation may be less than 20%, e.g., less than 15%, less than 12%, or less than 10%.

In some cases, the polymer film is effectively produced via a machine direction final stretch and/or a transverse direction final stretch ranging from 0% to 10%, e.g., from 0% to 7%, from 1% to 7%, from 1% to 5%, or from 2% to 4%. In terms of upper limits, the machine direction relaxation may be less than 10%, e.g., less than 7%, less than 5%, or less than 4%.

In some embodiments, the stretch orienting includes simultaneously stretching the formed film in both the machine direction and the transverse direction. Such simultaneous stretching can be selected to accommodate film production lines having shorter preheating times and/or higher temperatures of those disclosed herein. In alternative embodiments, the stretch orienting includes sequentially stretching the formed film in the machine direction and the transverse direction. The machine direction film stretching can be performed before the transverse direction film stretching. The transverse direction film stretching can be performed before the machine direction film stretching. Such sequential stretching can be selected to accommodate film production lines having longer preheating times and/or lower temperatures of those disclosed herein. In some embodiments, sequential stretching of the formed film at lower temperatures permits higher stretch ratios and results in films having higher puncture resistance.

In some embodiments, the stretch orienting includes annealing the formed film at a selected annealing temperature. The annealing temperature can range, for example, from 180° C. to 240° C., e.g., from 180° C. to 216° C., from 186° C. to 222° C., from 192° C. to 228° C., from 198° C. to 234° C., or from 204° C. to 240° C. In terms of upper limits, the annealing temperature can be less than 240° C., e.g., less than 234° C., less than 228° C., less than 222° C., less than 216° C., less than 210° C., less than 204° C., less than 198° C., less than 192° C., or less than 186° C. In terms of lower limits, the annealing temperature can be greater than 180° C., e.g., greater than 186° C., greater than 192° C., greater than 198° C., greater than 204° C., greater than 210° C., greater than 216° C., greater than 222° C., greater than 228° C., greater than 234° C. Higher annealing temperatures, e.g., greater than 240° C., and lower annealing temperatures, e.g., less than 180° C., are also contemplated.

Examples

The present disclosure will be better understood in view of the following non-limiting examples. The following examples are intended for illustrative purposes only and do not limit in any way the scope of the present disclosure.

The polymer films of Examples 1-3 were prepared using the compositions and processing parameters as shown in Table 1. Compositional percentages are expressed as weight percentages. Examples 1-3 were produced as biaxially oriented films (although other films, e.g., machine direction oriented films, are within the scope of this application).

The PA6 polymer had a heat deflection temperature less than 190° C. and a melting point of approximately 220° C. The PA66-s-6 statistical polymer had a heat deflection temperature as disclosed herein, e.g., in the range of 190° C. to 300° C., and a melting point as disclosed herein, e.g., in the range of 190° C. to 300° C. The resultant polymer films beneficially had a relatively high heat deflection temperature and a melting point as disclosed herein. The resultant polymer films beneficially had relative viscosities as disclosed herein, e.g., from 0.5 to 10.0.

TABLE 1

|  | Ex 1 | Ex 2 | Ex 3 |
|---|---|---|---|
| PA6 | 85% | 85% | 70% |
| PA66/6 (PA66-s-6) | 15% | 15% | 30% |
| Extrusion temperature | 250° C.-270° C. | 255° C.-275° C. | 255° C.-275° C. |
| Preheating time | 8.3 s-8.4 s | 8.3 s-8.4 s | 8.3 s-8.4 s |
| Preheating temperature | 50° C.-90° C. | 50°C.-90°C. | 50° C.-90° C. |
| Stretching temperature | 120° C.-160° C. | 120° C.-160° C. | 120° C.-160° C. |
| Annealing temperature | 210° C.-220° C. | 200° C.-210° C. | 200° C.-210° C. |
| MD stretch ratio | 3% | 3.16% | 3.16% |
| TD stretch ratio | 3.25% | 3.25% | 3.35% |
| MD relaxation | 0 | 5% | 5% |
| TD relaxation | 7.7% | 7.7% | 10% |
| MD final stretch | 3% | 3% | 3% |
| TD final stretch | 3% | 3% | 3% |
| MD shrinkage | 1% | 1% | 1% |
| TD shrinkage | 0.4% | 1% | 1% |

For each of Examples 1-3, multiple rolls of film, each having a length of 500 meters and a thickness of 15 microns, were prepared. Importantly, all Examples exhibited similar stretch ratios to one another, and to film prepared using 100% PA 6 (data not shown). These results demonstrate that the introduction of PA66/6 copolyamide as a film component does not undesirably increase the maximum stretch ratio or heat shrinkage of the overall film, but does provide for other synergistic performance characteristics. For each of the Examples, cast film quality was excellent, demonstrating the high processing flexibility and robustness of the film compositions as provided herein.

Additional exemplary and comparative polymer films were produced using polyamide compositions that included various relative amounts of PA6 and PA66/6, ranging from 100% PA6 to 100% PA66/6 as shown in Table 2. Compositional percentages are expressed as weight percentages. The mechanical performance properties of these films were measured as described herein, with the results of these measurements shown in FIGS. 1-4.

TABLE 2

|  | Comp A | Ex 4 | Ex 5 | Ex 6 | Ex 7 | Comp B |
|---|---|---|---|---|---|---|
| PA6 | 85% | 85% | 70% | 30% | 15% | 0 |
| PA66/6 (PA66-s-6) | 0 | 15% | 30% | 70% | 85% | 100% |

Figure 1:
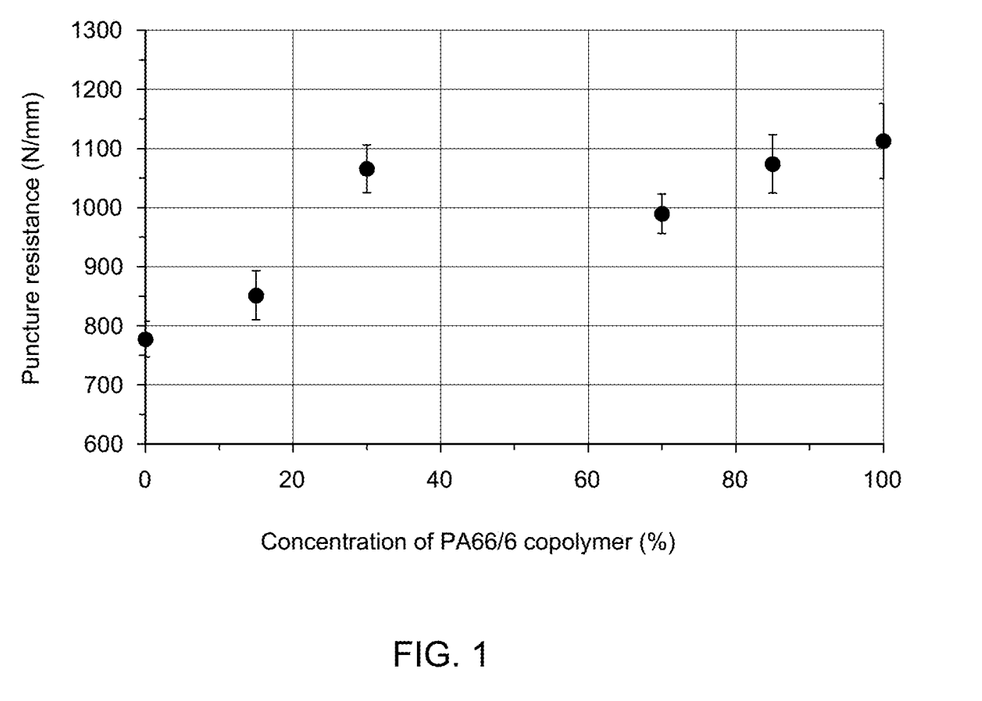
FIG. 1 is a graph of the puncture resistance of provided and comparative polymer films as a function of the concentration of PA66/6 copolymer additive in the film.

The graph of FIG. 1 shows a plot of the puncture resistance of polymer films having increasing concentration of PA66/6 copolymer additive relative to PA6 polymer. The results presented in the graph demonstrate that the addition of selected amounts of PA66/6 copolymer to the films as described herein beneficially increases the puncture resistance of the films relative to conventional polymer films that include only PA6 in their polyamide composition. This improvement can render the provided films less subject to damage by penetration when used, for example, in packaging applications.

Figure 2:
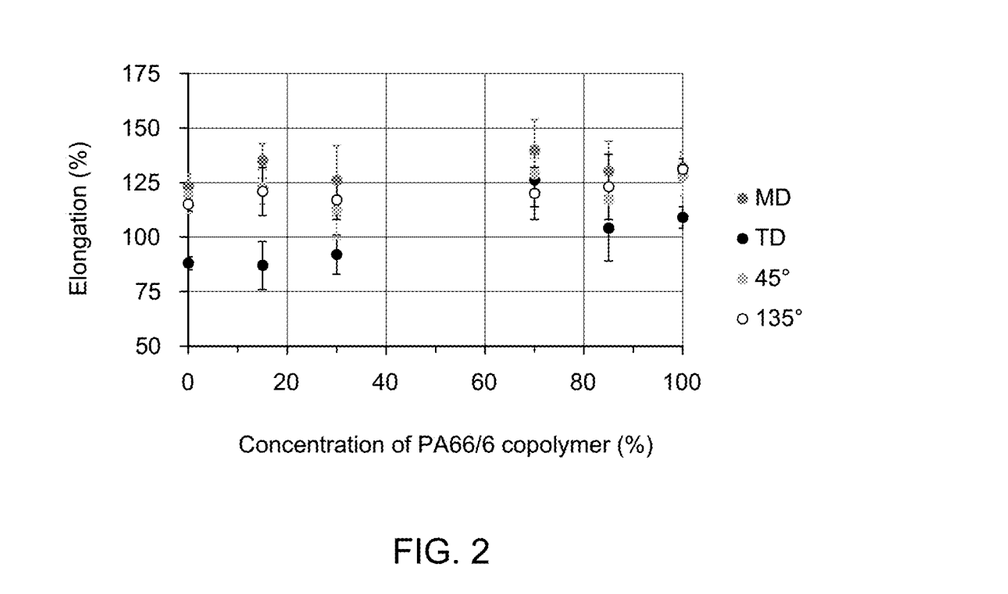
FIG. 2 is a graph of the tensile elongation of provided and comparative polymer films as a function of the concentration of PA66/6 copolymer additive in the film.

The graph of FIG. 2 shows a plot of the elongation of polymer films having increasing concentration of PA66/6 copolymer additive relative to PA6 polymer. The results presented in the graph demonstrate that the addition of selected amounts of PA66/6 copolymer to the films as described herein beneficially increases the elongation of the films relative to conventional polymer films that include only PA6 in their polyamide composition. This improvement can render the provided films less subject to damage by tearing or rupturing when used, for example, in packaging applications.

Figure 3:
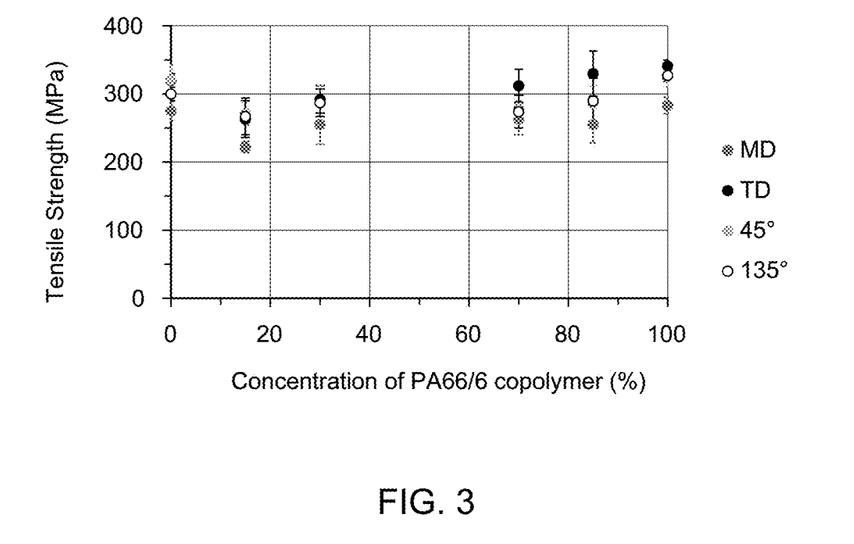
FIG. 3 is a graph of the tensile strength of provided and comparative polymer films as a function of the concentration of PA66/6 copolymer additive in the film.

The graph of FIG. 3 shows a plot of the tensile strength of polymer films having increasing concentration of PA66/6 copolymer additive relative to PA6 polymer. The results presented in the graph demonstrate that the addition of selected amounts of PA66/6 copolymer to the films as described herein does not significantly negatively affect the tensile of the films relative to conventional polymer films that include only PA6 in their polyamide composition. This can maintain the ability of the provided films to resist failure resulting from tensile forces.

Figure 4:
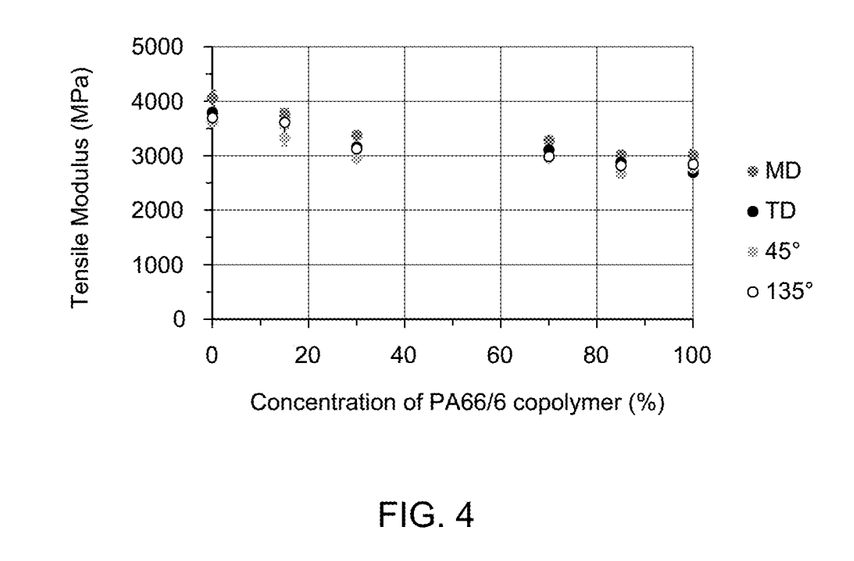
FIG. 4 is a graph of the tensile modulus of provided and comparative polymer films as a function of the concentration of PA66/6 copolymer additive in the film.

The graph of FIG. 4 shows a plot of the tensile modulus of polymer films having increasing concentration of PA66/6 copolymer additive relative to PA6 polymer. The results presented in the graph demonstrate that the addition of selected amounts of PA66/6 copolymer to the films as described herein beneficially decreases the tensile modulus of the films relative to conventional polymer films that include only PA6 in their polyamide composition. This improvement can render the provided films more amenable to processing steps such as film stretching or film thermoforming.

In some cases, the PA66/6 copolymer (standing alone) performs satisfactorily. However, the PA66/6 copolymer demonstrates reduced tensile modulus performance, and, importantly is much less cost effective when employed in very high amounts.

Embodiments

The following embodiments are contemplated. All combinations of features and embodiments are contemplated.

Embodiment 1: A polymer film comprising a polyamide composition, the polyamide composition comprising: less than 86 wt % of a PA6 polymer; and greater than 14 wt % of a PA66/6 copolymer; and wherein the film demonstrates puncture resistance that is greater than 800 N/mm, e.g., greater than 850 N/mm, as measured in accordance with standard test method ASTM F1306-16 (2016) using a probe radius of 1 mm.

Embodiment 2: An embodiment of embodiment 1, wherein the polymer film comprises: from 15 wt % to 85 wt %, e.g., from 55 wt % to 85 wt %, of the PA6 polymer; and from 15 wt % to 85 wt %, e.g., from 55 wt % to 85 wt %, of the PA 66/6 copolymer.

Embodiment 3: An embodiment of embodiment 1 or 2, wherein the PA66/6 copolymer is a statistical copolymer, e.g. PA66-s-6.

Embodiment 4: An embodiment of any of the embodiments of embodiment 1-3, wherein the relative viscosity of the polyamide composition ranges from 60 to 250, as measured in accordance with standard test method ASTM D789-19 (2019).

Embodiment 5: An embodiment of any of the embodiments of embodiment 1-4, wherein the PA66/6 copolymer comprises: greater than 70 wt % adipic acid-hexamethylene diamine units; and less than 30 wt % caprolactam units.

Embodiment 6: An embodiment of any of the embodiments of embodiment 1-5, wherein the melting point of the PA66/6 copolymer ranges from 200° C. to 255° C.

Embodiment 7: An embodiment of any of the embodiments of embodiment 1-6, wherein the PA66/6 copolymer comprises: from 75 wt % to 85 wt % adipic acid-hexamethylene diamine units; and from 15 wt % to 25 wt % caprolactam units; and wherein the melting point of the PA66/6 copolymer ranges from 215° C. to 223° C.

Embodiment 8: An embodiment of any of the embodiments of embodiment 1-6, wherein the PA66/6 copolymer comprises: from 80 wt % to 90 wt % adipic acid-hexamethylene diamine units; and from 10 wt % to 20 wt % caprolactam units; and wherein the melting point of the PA66/6 copolymer ranges from 230° C. to 238° C.

Embodiment 9: An embodiment of any of the embodiments of embodiment 1-8, wherein the polyamide composition comprises less than 90 wt % caprolactam units.

Embodiment 10: An embodiment of any of the embodiments of embodiment 1-9, wherein the polyamide composition comprises from 55 wt % to 90 wt % caprolactam units.

Embodiment 11: An embodiment of any of the embodiments of embodiment 1-10, wherein the weight ratio of adipic acid-hexamethylene diamine units to caprolactam units in the PA66/6 copolymer ranges from 2:1 to 16:1.

Embodiment 12: An embodiment of any of the embodiments of embodiment 1-11, wherein the weight ratio of the PA6 polymer to the PA66/6 copolymer in the polyamide composition ranges from 1:1 to 6:1.

Embodiment 13: An embodiment of any of the embodiments of embodiment 1-12, wherein the weight ratio of caprolactam units to adipic acid-hexamethylene diamine units in the polyamide composition ranges from 1:1 to 9:1.

Embodiment 14: An embodiment of any of the embodiments of embodiment 1-13, wherein the film demonstrates transverse direction elongation that is greater than 85%, e.g., greater than 88%, as measured in accordance with standard test method ASTM D882-18 (2018).

Embodiment 15: An embodiment of any of the embodiments of embodiment 1-14, wherein the film demonstrates impact resistance that is greater than 9.6 N, as measured in accordance with standard test method ASTM D1709-16ae1 (2016).

Embodiment 16: An embodiment of any of the embodiments of embodiment 1-15, wherein the film demonstrates transverse direction tensile strength that is greater than 250 MPa, as measured in accordance with standard test method ASTM D882-18 (2018).

Embodiment 17: An embodiment of any of the embodiments of embodiment 1-16, wherein the film demonstrates transverse direction tensile modulus that is less than 3800 MPa, e.g., less than 3500 MPa, as measured in accordance with standard test method ASTM D882-18 (2018).

Embodiment 18: An embodiment of embodiment 1, wherein the polyamide composition comprises: from 55 wt % to 85 wt % of the PA6 polymer; and from 15 wt % to 45 wt % of the PA66/6 copolymer; and wherein the film demonstrates puncture resistance that is greater than 1000 N/mm and transverse direction elongation that is greater than 90%.

Embodiment 19: An embodiment of embodiment 1, wherein the polyamide composition comprises: from 55 wt % to 85 wt % of the PA6 polymer; and from 15 wt % to 45 wt % of the PA66/6 copolymer; and wherein the film demonstrates puncture resistance that is greater than 900 N/mm and transverse direction elongation that is greater than 95%; and wherein the relative viscosity of the polyamide composition ranges from 70 to 130.

Embodiment 20: An embodiment of embodiment 1, wherein the polyamide composition comprises: from 55 wt % to 85 wt % of the PA6 polymer; and from 15 wt % to 45 wt % of the PA66/6 copolymer; and wherein the film demonstrates puncture resistance that is greater than 900 N/mm and transverse direction elongation that is greater than 95%; and wherein the relative viscosity of the polyamide composition ranges from 100 to 200.

Embodiment 21: An embodiment of any of the embodiments of embodiment 1-20, further comprising one or more additives selected from the group consisting of one or more heat stabilizers, one or more lubricants, and one or more anti-blocking agents.

Embodiment 22: An embodiment of embodiment 21, wherein the one or more anti-blocking agents are selected from the group consisting of diatomaceous earth and silica microparticles.

Embodiment 23: An embodiment of embodiment 21 or 22, wherein at least one of the one or more heat stabilizers comprise copper.

Embodiment 24: An embodiment of any of the embodiments of embodiment 1-23, further comprising: one or more additional polyamide copolymers.

Embodiment 25: An embodiment of embodiment 24, wherein the one or more additional polyamide copolymers are selected from the group consisting of PA66/6,10, PA6, 10, PA66/6,12, and PA6,12.

Embodiment 26: An embodiment of any of the embodiments of embodiment 1-25, wherein the film is oriented by stretching in the machine direction at a machine direction stretch ratio ranging from 3 to 3.8, and stretching in the transverse direction at a transverse direction stretch ratio ranging from 3.1 to 5.

Embodiment 27: An embodiment of any of the embodiments of embodiment 1-26, having a heat shrinkage less than 2%.

Embodiment 28: An embodiment of any of the embodiments of embodiment 1-27, wherein the polymer film exhibits a maximum stretch ratio no greater than the maximum stretch ratio of a corresponding film comprising no PA66/6 copolymer, and wherein the polymer film exhibits a heat shrinkage no greater than the heat shrinkage of the corresponding film.

Embodiment 29: An embodiment of any of the embodiments of embodiment 1-28, wherein the film thickness is less than 26 microns and wherein the film demonstrates a puncture resistance that is greater than 825 N/mm.

Embodiment 30: An embodiment of any of the embodiments of embodiment 1-29, wherein the concentration of total caprolactam units in the polyamide composition ranges from 26 wt % to 74 wt %.

Embodiment 31: An embodiment of any of the embodiments of embodiment 1-30, wherein the concentration of total caprolactam units in the non-PA6 ranges from 5 wt % to 40 wt %.

Embodiment 32: A method of preparing a polymer film, the method comprising: providing a PA6 polymer and a PA66/6 copolymer; blending the PA6 polymer and the PA66/6 copolymer to create a polyamide composition comprising greater than or equal to 15 wt % PA66/6; casting the created polyamide composition to form a film; and stretch orienting the formed film, thereby preparing the polymer film, wherein the film demonstrates puncture resistance that is greater than 850 N/mm.

Embodiment 33: An article comprising the oriented film of an embodiment of any of the embodiments of embodiment 1-32.

While the invention has been described in detail, modifications within the spirit and scope of the invention will be readily apparent to those of skill in the art in view of the foregoing discussion, relevant knowledge in the art, and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A film comprising a polyamide composition, the polyamide composition comprising:
   from 15 wt % to 85 wt % of a PA6 polymer; and
   from 15 wt % to 85 wt % of a PA66/6 copolymer,
   wherein weight percentages are based upon total polyamide composition;
   wherein the total of caprolactam units in the PA66/6 copolymer ranges from 5 wt % to 40 wt %, and
   wherein the film demonstrates puncture resistance that is greater than 800 N/mm, as measured in accordance with standard test method ASTM F1306-16 (2016).

2. The polymer film of claim 1, wherein the PA66/6 copolymer is a statistical copolymer.

3. The polymer film of claim 1, wherein the film is a biaxially oriented film.

4. The polymer film of claim 1, wherein the film has a heat deflection temperature greater than 190° C.

5. The polymer film of claim 1, wherein the film thickness is less than 26 microns and wherein the film demonstrates a puncture resistance that is greater than 825 N/mm.

6. The polymer film of claim 1, wherein the total of caprolactam units in the polyamide composition ranges from 26 wt % to 74 wt %.

7. The polymer film of claim 1, wherein the PA66/6 copolymer comprises:
   from 75 wt % to 85 wt % adipic acid-hexamethylene diamine units; and
   from 15 wt % to 25 wt % caprolactam units;
   wherein wt % is based upon total PA66/6 copolymer, and
   wherein the melting point of the PA66/6 copolymer ranges from 215° C. to 223° C.

8. The polymer film of claim 1, wherein the PA66/6 copolymer comprises:
   from 80 wt % to 90 wt % adipic acid-hexamethylene diamine units; and
   from 10 wt % to 20 wt % caprolactam units;
   wherein wt % is based upon total PA66/6 copolymer, and
   wherein the melting point of the PA66/6 copolymer ranges from 230° C. to 238° C.

9. The polymer film of claim 1, wherein the film demonstrates transverse direction elongation that is greater than 85%, as measured in accordance with standard test method ASTM D882-18 (2018).

10. The polymer film of claim 1, wherein the film demonstrates impact resistance that is greater than 9.6 N, as measured in accordance with standard test method ASTM D1709-16ae1 (2016).

11. The polymer film of claim 1, wherein the film demonstrates a transverse direction tensile strength that is greater than 250 MPa, as measured in accordance with standard test method ASTM D882-18 (2018) or a transverse direction tensile modulus that is less than 3800 MPa, as measured in accordance with standard test method ASTM D882-18 (2018).

12. The polymer film of claim 1, wherein the polyamide composition comprises:
   from 55 wt % to 85 wt % of the PA6 polymer; and
   from 15 wt % to 45 wt % of the PA66/6 copolymer; and
   wherein the film demonstrates puncture resistance that is greater than 850 N/mm and transverse direction elongation that is greater than 90%.

13. The polymer film of claim 1, further comprising diatomaceous earth and silica microparticles.

14. The polymer film claim 1, wherein the film is oriented by stretching in the machine direction at a machine direction stretch ratio ranging from 3 to 3.8, and stretching in the transverse direction at a transverse direction stretch ratio ranging from 3.1 to 5.

15. The polymer film of claim 1, having a heat shrinkage less than 2%.

16. The polymer film of claim 1, wherein the polymer film exhibits a maximum stretch ratio no greater than the maximum stretch ratio of a corresponding film comprising no PA66/6 copolymer, and wherein the polymer film exhibits a heat shrinkage no greater than the heat shrinkage of the corresponding film.

17. A method of preparing a polymer film, the method comprising:
   providing from 15 wt % to 85 wt % of a PA6 polymer and from 15 wt % to 85 wt % a PA66/6 copolymer, wherein weight percentages are based upon total polyamide composition, and wherein the total of caprolactam units in the PA66/6 copolymer ranges from 5 wt % to 40 wt %;
   blending the PA6 polymer and the PA66/6 copolymer to create a polyamide composition;
   casting the created polyamide composition to form a film; and
   stretch orienting the formed film, thereby preparing the polymer film, wherein the film demonstrates puncture resistance that is greater than 850 N/mm.

18. An article comprising the film of claim 1 wherein the film is biaxially oriented.

19. A film comprising a polyamide composition, the polyamide composition comprising:
   from 15 wt % to 70 wt % of a PA6 polymer; and
   from 30 wt % to 85 wt % of a PA66/6 copolymer, wherein weight percentages are based upon total polyamide composition,
   wherein the total caprolactam content in the polyamide composition ranges from 26 wt % to 74 wt %; and wherein the film demonstrates puncture resistance that is greater than 800 N/mm, as measured in accordance with standard test method ASTM F1306-16 (2016).

20. The polymer film of claim 19, further comprising diatomaceous earth and silica microparticles.

\* \* \* \* \*